US 6,698,999 B2

(12) United States Patent
Morman

(10) Patent No.: US 6,698,999 B2
(45) Date of Patent: Mar. 2, 2004

(54) DUAL ROTATING STOCK SYSTEM

(75) Inventor: Mark J. Morman, Angola, IN (US)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 0 days.

(21) Appl. No.: 09/992,307

(22) Filed: Nov. 19, 2001

(65) Prior Publication Data

US 2003/0095859 A1 May 22, 2003

(51) Int. Cl.[7] ................................................. B23Q 7/00
(52) U.S. Cl. ...................................... 414/676; 198/346.1
(58) Field of Search .................. 29/33 P; 198/346.1; 414/676

(56) References Cited

U.S. PATENT DOCUMENTS

| | | | | |
|---|---|---|---|---|
| 3,237,708 A | * | 3/1966 | Strasser et al. | 414/676 X |
| 3,693,965 A | * | 9/1972 | Mitsengendler | 414/676 X |
| 3,825,245 A | * | 7/1974 | Osburn et al. | 269/30 |
| 4,090,287 A | | 5/1978 | Selander | 483/1 |
| 4,275,983 A | * | 6/1981 | Bergman | 414/676 |
| 4,543,970 A | * | 10/1985 | Noh et al. | 134/62 |
| 4,717,306 A | | 1/1988 | Satake | 414/222.08 |
| 4,832,170 A | | 5/1989 | Takeuchi et al. | 198/346.1 |
| 5,018,617 A | * | 5/1991 | Miyata et al. | 198/346.1 |
| 5,156,254 A | | 10/1992 | Kitamura et al. | 198/346.1 |
| 5,346,051 A | | 9/1994 | Keith | 198/346.1 |
| 5,368,150 A | | 11/1994 | Okada et al. | 198/346.1 |
| 5,862,718 A | * | 1/1999 | Kiesling | 414/676 X |
| 6,178,609 B1 | | 1/2001 | Laur | 29/33 P |
| 6,183,188 B1 | | 2/2001 | Randazzo et al. | 414/744.5 |

* cited by examiner

Primary Examiner—Janice L. Krizek
(74) Attorney, Agent, or Firm—Harness, Dickey & Pierce, PLC

(57) ABSTRACT

A pallet changer is rotatable around a pin which releasably engages a shop floor. A pneumatic load module assembly creates a cushion of air which supports the pallet changer for manual rotation. The pin can be released from the floor to allow linear horizontal movement of the pallet changer or the cushion of air when it is necessary to repair, refurbish or replace equipment adjacent the pallet changer.

15 Claims, 3 Drawing Sheets

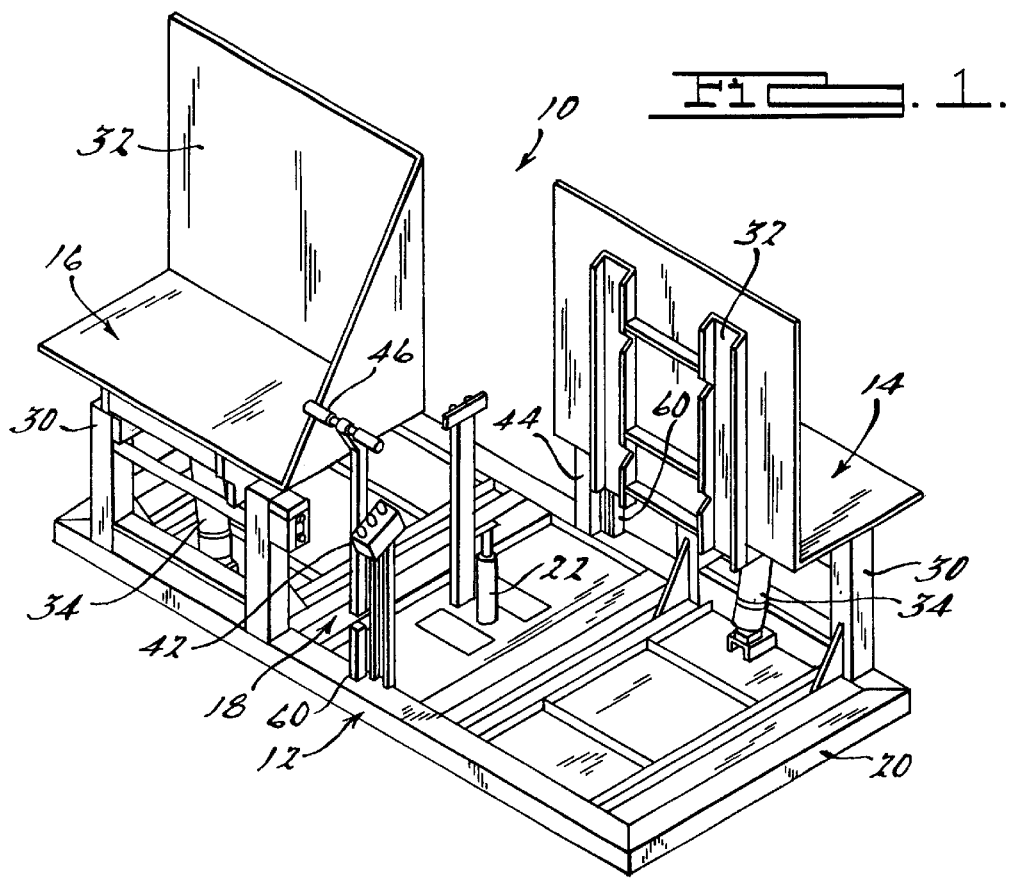
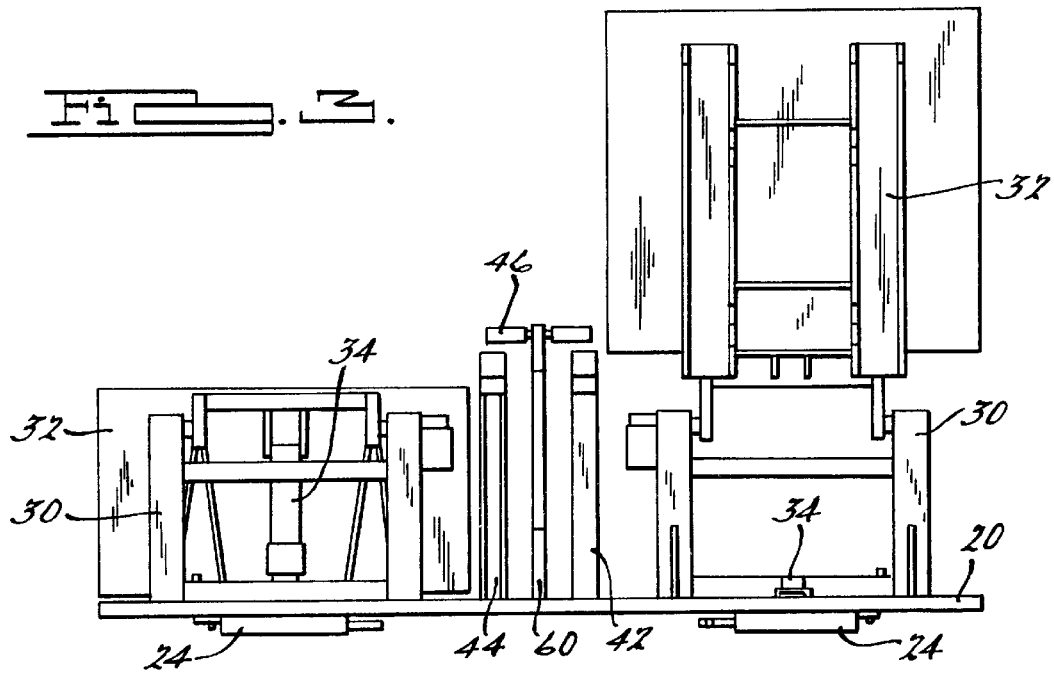

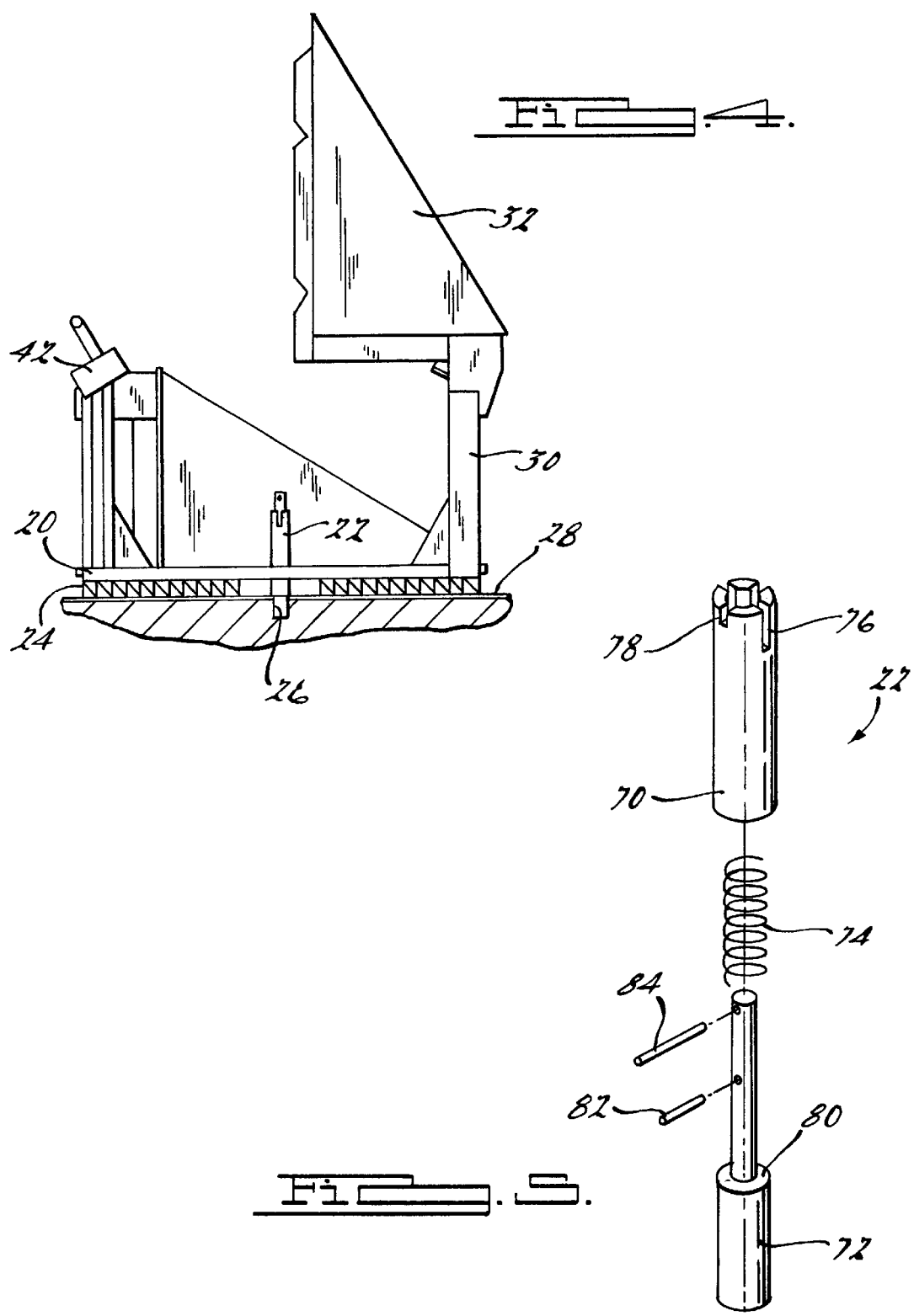

US 6,698,999 B2

DUAL ROTATING STOCK SYSTEM

FIELD OF THE INVENTION

The present invention relates to a device for feeding a supply of materials to a working station. More particularly, the present invention relates to a rotatable stock feeding mechanism which can be manually rotated to present a new supply of materials to a working station.

BACKGROUND OF THE INVENTION

Manufacturing facilities typically supply components in bulk to a working station. The working station can be a machining center, an assembly line or any other type of working station. The components that need to be machined or assembled are supplied in a box, a bin, a pallet or in any other form of bulk supply. The worker at the working station works through the components that have been supplied and when all components in the box, bin, pallet or in any other form of bulk supply have been machined or used, it becomes necessary to restock the work station with additional components.

In order to improve the efficiency of supplying and removing components from a working station, pallet changers have been developed. Pallet changers typically include a pallet support which is rotatable between the work station and a pallet supply station. The pallet supply station is where the finished components or empty pallets are removed and a new pallet filled with unfinished components or a new supply of components are supplied. A pallet or other container, on which components to be finished or assembled are stacked, is transferred from the pallet supply station to the working station. After the components are finished or assembled, the pallet or container, which has been finished or emptied, is transferred from the working station to the pallet supply station by rotation of the pallet changer. The rotation of the pallet changer moves the finished components or empty container to the pallet supply station while simultaneously moving a pallet or container of unfinished or unassembled components from the pallet supply station to the working station. Once, the finished components or empty containers arrive at the pallet supply station they can be exchanged for a pallet or container of unfinished or unassembled components and the cycle continues. Thus, the pallet changers ensure a continuous supply of materials to the working station.

The incorporation of these pallet changers has improved the operating efficiency of the machining tool or the assembly process, but, the automatic pallet changers are expensive and difficult to maintain. In addition, the pallet changers require additional floor space for installation of the corresponding hydraulic pneumatic and/or electrical power units. Therefore, in a manufacturing plant, it may become difficult to install the pallet changer with its associated power unit once the machine tool and/or assembly line has been installed. Once the pallet changer has been installed, further problems may occur during maintenance/repair of the machine tool on the assembly line. In order to properly service the machine tool on the assembly line, it may be necessary to partially dismantle the pallet changer in order to gain access to the machine tool or the assembly line.

Continued development of these pallet chambers has been directed towards systems that are less complicated, lower cost and systems which can easily be moved in order to provide access to the respective machine tool or assembly line.

SUMMARY OF THE INVENTION

The present invention provides the art with a dual rotating stock system which includes a pair of tilt master positioning devices disposed at opposite ends of a rotatable turntable. The system incorporates a pair of aero-casters which lift the system in order to allow for the rotation between its two positions. The system rotates around a detent pin which engages a hole in the shop floor. The detent pin is retractable to allow for the horizontal movement of the system using the air springs when it is necessary to provide access to the manufacturing tool and/or assembly line.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of the dual rotating stock system in accordance with the present invention;

FIG. 3 is a front elevational view of the dual rotating stock system shown in FIGS. 1 and 2;

FIG. 4 is an end elevational view of the dual rotating stock system shown in FIGS. 1–3; and FIG. 5 is an exploded perspective view of the detent pin assembly for the dual rotating stock system of the present invention.

DETAILED DESCRIPTION OF THE PREFERRED EMBODIMENTS

Figure 2:
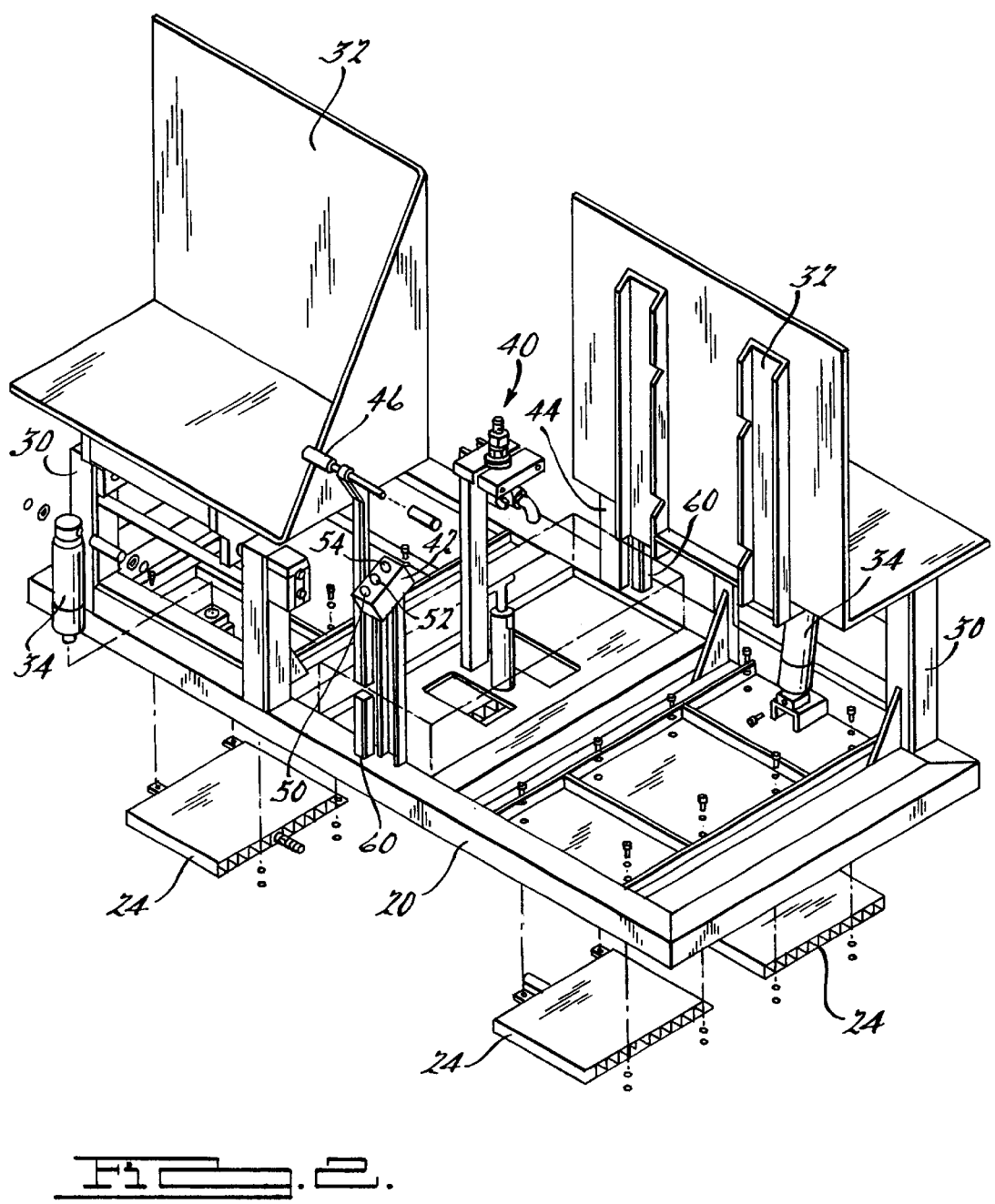
FIG. 2 is an exploded perspective view of the dual rotating stock system shown in FIG. 1.

The following description of the preferred embodiment(s) is merely exemplary in nature and is in no way intended to limit the invention, its application, or uses.

Referring now to the drawings in which like reference numerals designate like or corresponding parts throughout the several views, there is shown in FIGS. 1–4, a dual rotating stock system in accordance with the present invention and which is designated generally by the reference numeral 10. Dual rotating stock system 10 comprises a rotating base assembly 12, a first stock supporting device in the form of a first tilting deck assembly 14, a second stock supporting device in the form of a second tilting deck assembly 16 and a control system 18.

Rotating base assembly 12 comprises a generally rectangular frame 20, a centrally located detent pin assembly 22 and a plurality of pneumatic load module assemblies 24. Rectangular frame 20 is adapted at one end for mounting first tilting deck assembly 14 and it is adapted at the other end for mounting second tilting deck assembly 16. Detent pin assembly 22 is mounted to the center of rectangular frame 20 and it is adapted to engage a hole 26 formed into the mounting floor 28 to which dual rotating stock system 10 is associated. Detent pin assembly 22 extends into hole 26 to provide a generally vertical axis around which generally rectangular frame 20 rotates. Detent pin assembly 22 is retractable as detailed below.

The plurality of pneumatic load module assemblies 24 are disposed between frame 20 and floor 28. Pneumatic load module assemblies 24 are manufactured by AeroGo Inc. and are well known in the art. Given a smooth surface such as floor 28 and a supply of air at the right pressure and volume, pneumatic load module assemblies 24 will lift dual rotating stock system 10 to enable a manual rotation of stock system 10 around detent pin assembly 22 as detailed below.

First tilting deck assembly 14 is attached to one end of frame 20 of rotating base assembly 12. Tilting deck assembly 14 comprises a stationary frame 30, a pivoting deck 32 and a pressure cylinder 34. Stationary frame 30 is secured to frame 20 of rotating base assembly 12 and it provides mounting locates for both pivoting deck 32 and pressure cylinder 34. Pivoting deck 32 is pivotably secured to stationary frame 30 such that it is pivotable between a lower position as shown in FIGS. 3 and 4 and an upper position as also shown in FIGS. 3 and 4. In its lower position, pivoting deck 32 can easily be loaded with components that need to be processed or assembled, and it can easily be unloaded with components that have already been processed or empty containers whose parts have already been assembled. In its upper position, or at any position between its lower and upper position pivoting deck 32 can present the unprocessed or unassembled components to an operation at a convenient height or position to eliminate or reduce fatigue of the operator. Pressure cylinder 34 extends between frame 30 and pivoting deck 32. Pressure cylinder 34 operates to move pivoting deck 32 between its lower position, its upper position and any position between its lower and upper position to present unprocessed or unassembled components to the operator. Pressure cylinder 34 can be powered by pressurized air or pressurized hydraulic fluid depending on what pressurized source is available and what load needs to be pivoted.

Second tilting deck assembly 16 is attached to the other end of frame 20 of rotating base assembly 12. Tilting deck assembly 16 also comprises a stationary frame 30, a pivoting deck 32 and a pressure cylinder 34. Stationary frame 30 is secured to frame 20 of rotating base assembly 12 and it provides mounting locates for both pivoting deck 32 and pressure cylinder 34. Pivoting deck 32 is pivotably secured to stationary frame 30 such that it is pivotable between a lower position as shown in FIGS. 3 and 4 and an upper position as also shown in FIGS. 3 and 4. In its lower position, pivoting deck 32 can easily be loaded with components that need to be processed or assembled, and it can easily be unloaded with components that have already been processed or empty containers whose parts have already been assembled. In its upper position, or at any position between its lower and upper position pivoting deck 32 can present the unprocessed or unassembled components to an operation at a convenient height or position to eliminate or reduce fatigue of the operator. Pressure cylinder 34 extends between frame 30 and pivoting deck 32. Pressure cylinder 34 operates to move pivoting deck 32 between its lower position, its upper position and any position between its lower and upper position to present unprocessed or unassembled components to the operator. Pressure cylinder 34 can be powered by pressurized air or pressurized hydraulic fluid depending on what pressurized source is available and what load needs to be pivoted.

Control system 18 comprises an input system 40, a first control box 42, a second control box 44 and a removable handle 46. Input system 40 receives pressurized gas and/or pressurized hydraulic fluid from an external source and routes these pressurized fluids to the plurality of pneumatic load module assemblies 24, first tilting deck assembly 14 and second tilting deck assembly 16. The supply and release of the pressurized fluids is controlled by first and second control boxes 42 and 44. Control boxes 42 and 44 each include three buttons 50, 52 and 54. Each button 50, 52 and 54 on each control box 42 and 44 perform the same function. Each button 50 on control boxes 42 and 44 controls the supply of pressurized air to the plurality of pneumatic load module assemblies 24. Each button 52 controls the supply of pressurized fluid to first tilting deck assembly 14 to raise and lower its deck 32 using its pressure cylinder 34. Each button 54 controls the supply of pressurized fluid to second tilting deck assembly 16 to raise and lower its deck 32 using its pressure cylinder 34.

The description of the operation for dual rotating stock system 10 will begin with first tilting deck assembly 14 being loaded with unprocessed or unassembled components and being located adjacent the working station and second tilting deck assembly 16 being loaded with processed components or holding an empty container. In this position, the operator at the work station takes components from deck assembly 14 for processing and assembly. The ability of pivoting deck 32 to tilt allows for the convenient positioning of the supply of components initially, as well as the repositioning of the components as the operator works through the supply of components loaded onto deck assembly 14. While the operator is working through the supply of components loaded onto deck assembly 14, the supply of processed components or the empty container on deck assembly 16 can be replaced by another supply of unprocessed or unassembled components. The individual responsible for this resupply of unprocessed or unassembled components will have sufficient time for the component exchange for deck assembly 16 while the operator at the work station works through the components on deck assembly 14.

When the operator at the working station has exhausted the supply of components in deck assembly 14 and a new supply of components have been placed on deck assembly 16, the operator actuates the plurality of pneumatic load module assemblies 24 using one of the buttons 50 on box 42 or box 44 to raise stock system 10 above floor 28. In this position, stock system 10 is supported by a cushion of air. Handle 46 can then be used to rotate base assembly 12 around detent pin assembly 22 to position deck assembly 16 adjacent the working station and position deck assembly 14 opposite to the working station. Handle 46 is removable from a pair of brackets 60 located on opposing sides of base assembly 12 to allow convenient positioning for handle 46. Rotating base assembly may be provided with one or more detent systems which lock rotating base assembly in the two positions where deck assembly 14 and deck assembly 16 are positioned adjacent the working station if desired. If a detent system is incorporated, it must be released manually or automatically prior to the rotation of base assembly 12. Pivoting deck 32 of deck assembly 14 can be returned to its lower position either before or after the rotation of base assembly 12 using one of buttons 52 on one of control boxes 42 or 44. In a similar manner, pivoting of deck 32 of deck assembly 16 can be raised from its lower position either before or after the rotation of base assembly 12 using one of buttons 54 on one of control boxes 42 or 44.

When the rotation of base assembly 12 is complete and deck assembly 16 is adjacent the working station, the plurality of pneumatic load module assemblies 24 are deactivated and stock system 10 comes to a stationary position on floor 28. The operator at the working station continues operating the working station using components from deck assembly 16 while the processed components or empty container is removed from deck assembly 14 and deck assembly 14 is resupplied with unprocessed or unassembled components. When the supply of components in deck assembly 16 becomes exhausted, the resupply process of rotating stock system 10 as described above is performed to now place deck assembly 14 adjacent the working station.

At times it may be necessary to replace, repair and/or refurbish the manufacturing equipment at the working station. Detent pin assembly 22 is designed to simplify this process. Referring now to FIG. 5, detent pin assembly 22 comprises an outer housing 70, a pin 72 and a biasing spring 74. Outer housing 70 is a tubular housing secured to frame 20 and it defines a lower stop 76 and an upper stop 78. Pin 72 is slidingly received within outer housing 70 with biasing spring 74 being located between a shoulder 80 defined by pin 72 and a stop (not shown) defined by housing 70 such that pin 72 is biased in a downward direction or towards the bottom of frame 20. A stop 82 extends through pin 72 and is designed to rest within either of lower stop 76 or upper stop 78. A handle 84 extends through pin 72 to facilitate the movement of pin 72 between a first position where stop 82 engages lower stop 76 and a second position where stop 82 engages upper stop 78.

Pin 72 is typically located in its lower position with stop 82 engaging lower stop 76. In this position, pin 72 extends below the lower surface of frame 20 and engages hole 26 formed into floor 28. In this position, stock system 10 is rotatable around an axis defined by pin 72 due to the engagement of pin 72 with hole 26. This rotation of stock system 10 is described above in relation to positioning deck assembly 14 or deck assembly 16 adjacent the working station.

When it is advantageous to move stock system 10 linearly horizontally along floor 28, pin 72 can be disengaged from hole 26. The operator grasps handle 84 and pulls pin 72 upward against the force of biasing spring 74. Once stop 82 is located above housing 70, pin 72 can be rotated to align stop 82 with upper stop 78 and handle 84 can be released to engage stop 82 with upper stop 74. In this position, the end of pin 78 is located above or even with the lower surface of frame 20 and therefore no longer defines a vertical axis for rotation. The operator activates the plurality of pneumatic load module assemblies 24 using one of the buttons 50 on box 42 and box 44 to raise stock system 10 above floor 28. In this position, stock system 10 is supported by a cushion of air. Handle 46 can then be used to move stock system 10 horizontally along floor 28 to provide access to the machining equipment at the working station. The amount of horizontal movement of stock system 10 will be determined by the length of flexible lines providing the pressurized fluid and the availability of open space around stock system 10. Once stock system 10 has been moved, the pressurized air is removed from the plurality of pneumatic load module assemblies 24 and stock system 10 will come to rest at its new location.

When it is desired to move stock system back to its original position, pressurized air is provided to the plurality of pneumatic load module assemblies 24, stock system 10 is moved to align pin 72 with hole 26, pin 72 is returned to its lower position and the pressurized air is removed from the plurality of pneumatic load module assemblies 24.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pallet changer comprising:
   a base assembly adapted to be rotatably supported on a floor;
   a first pivotal stock supporting device secured to said base assembly;
   a second independently pivotal stock supporting device secured to said base assembly;
   a load module assembly attached to said base assembly, said load module assembly being operable to lift said pallet changer off said floor when supplied with a pressurized fluid; and
   a control system for selectively supplying said pressurized fluid.

2. The pallet changer described in claim 1, wherein said base assembly is releasably supported on said floor.

3. The pallet changer described in claim 1, wherein said load module assembly creates a cushion of pressurized fluid to lift said pallet changer to allow manual, linear horizontal movement.

4. The pallet changer described in claim 1, wherein said first stock supporting device comprises a first frame attached to said base assembly, and a first deck pivotally secured to said first frame.

5. The pallet changer described in claim 4, wherein said second stock supporting device comprises a second frame attached to said base assembly, and a second deck pivotally secured to said second frame.

6. The pallet changer as described in claim 1 wherein said base assembly includes a pin adapted to engage a hole in said floor, said pin defining a limit of rotation for said base assembly.

7. The pallet changer as described in claim 6, wherein said pin is moveable between a first position wherein said pin engages said hole and a second position wherein said pin is released from said hole.

8. The pallet changer as described in claim 7, wherein said load module assembly creates a cushion of pressurized fluid to lift said pallet changer to allow manual rotation of said base assembly when said pin is in said first position.

9. The pallet changer as described in claim 7, wherein said load module assembly creates a cushion of pressurized fluid to lift said pallet changer to allow manual, linear horizontal movement of said pallet changer.

10. A pallet changer comprising:
    a base assembly adapted to be releasably supported for rotation on a floor;
    a first stock supporting device secured to said base, said first stock supporting device including a first frame attached to said base and a first deck moveably secured to said first frame;
    a second stock supporting device secured to said base, said second stock supporting device including a second frame attached to said base orientated 180 degrees to said first frame, and a second deck moveably secured to said second frame;
    a load module assembly attached to said base, said load module assembly being operable to lift said pallet changer off said floor when supplied with a pressurized fluid; and
    a control system for selectively supplying said pressurized fluid.

11. The pallet changer as described in claim 10, wherein said load module assembly creates a cushion of pressurized fluid to lift said pallet changer to allow manual linear horizontal movement.

12. The pallet changer as described in claim 10 wherein said base assembly includes a pin adapted to engage a hole in said floor, said pin defining a limit of rotation for said base assembly.

13. The pallet changer as described in claim 12, wherein said pin is moveable between a first position wherein said pin engages said hole and a second position wherein said pin is released from said hole.

14. The pallet changer as described in claim 13, wherein said load module assembly creates a cushion of pressurized fluid to lift said pallet changer to allow manual rotation of said base assembly when said pin is in said first position.

15. The pallet changer as described in claim 13, wherein said load module assembly creates a cushion of pressurized fluid to lift said pallet changer to allow manual, linear horizontal movement of said pallet changer.

\* \* \* \* \*